(12) United States Patent
Albert et al.

(10) Patent No.: US 10,103,672 B2
(45) Date of Patent: Oct. 16, 2018

(54) STATOR SEGMENT FOR A LINEAR MOTOR-BASED TRANSPORT SYSTEM AND TRANSPORT SYSTEM

(71) Applicants: Siemens Aktiengesellschaft, Munich (DE); Festo AG & Co. KG, Esslingen (DE)

(72) Inventors: Fabian Albert, Kernen im Remstal (DE); Marco Gierden, Weisendorf (DE); Ralf Hartramph, Albershausen (DE); Michael Jaentsch, Erlangen (DE); Sven Rothe, Tabarz (DE); Carsten Spindler, Remptendorf (DE); Andreas Veit, Filderstadt (DE)

(73) Assignees: Siemens Aktiengesellschaft, Munich (DE); Festo AG & Co. KG, Esslingen (DE)

( * ) Notice: Subject to any disclaimer, the term of this patent is extended or adjusted under 35 U.S.C. 154(b) by 3 days.

(21) Appl. No.: 15/488,838

(22) Filed: Apr. 17, 2017

(65) Prior Publication Data

US 2017/0310262 A1  Oct. 26, 2017

(30) Foreign Application Priority Data

Apr. 22, 2016  (EP) .................................... 16166648

(51) Int. Cl.
  *H02K 41/00* (2006.01)
  *H02N 3/00* (2006.01)
  (Continued)

(52) U.S. Cl.
  CPC .............. *H02P 25/06* (2013.01); *B60L 13/03* (2013.01); *B60L 15/005* (2013.01); *B60M 7/00* (2013.01);
  (Continued)

(58) Field of Classification Search
  None
  See application file for complete search history.

(56) References Cited

U.S. PATENT DOCUMENTS

2012/0247925 A1  10/2012  Cooke
2016/0190966 A1*  6/2016  Kadynski ............... H02P 25/06
              318/135

FOREIGN PATENT DOCUMENTS

WO  WO 98/50760 A2  11/1998

OTHER PUBLICATIONS

Mutschler Peter, "Comparison of topologies for linear drives in industrial material handling and processing applications", The 7th international Conference on power electronics, Oct. 22-26, 2007 in Daegu Korea, pp. 1027-1032, ISBN: 978-1-4244-1872-5; XP031367212; 2007.

(Continued)

*Primary Examiner* — Bentsu Ro
*Assistant Examiner* — Zemenay Truneh
(74) *Attorney, Agent, or Firm* — Cozen O'Connor

(57) ABSTRACT

A stator segment for a linear motor-based transport system is developed to the effect that a transmitter for cyclic transmission of a control data record in a first clock cycle also transmits, in addition to transmitting the control data record, a position value in a clock-synchronized manner, wherein a plurality of positions are available as a sequence with a quantity of elements and an element with an index corresponds to a position, where the transmitter unit is configured such that, upon every first clock cycle, the index is incremented commencing from a starting value and an element is transmitted after the control data record, where the transmitter unit is furthermore configured to transmit all (Continued)

elements in one transmission interval, and where the transmission interval corresponds to a multiple of the first clock cycle.

10 Claims, 4 Drawing Sheets

(51) Int. Cl.
*H02P 25/06* (2016.01)
*H02K 11/215* (2016.01)
*B60L 13/03* (2006.01)
*B60L 15/00* (2006.01)
*B60M 7/00* (2006.01)
*B65G 54/02* (2006.01)
*H04L 12/403* (2006.01)
*H04L 12/407* (2006.01)
*H02P 25/064* (2016.01)

(52) U.S. Cl.
CPC ........... *B65G 54/02* (2013.01); *H02K 11/215* (2016.01); *H04L 12/407* (2013.01); *H04L 12/4035* (2013.01); *H02P 25/064* (2016.02)

(56) References Cited

OTHER PUBLICATIONS

Mihalachi M. et al. "Motion control for long primary linear drives used in material handling", 14th International power electronics and motion control conference, epe-pemc 2010, Jun. 9, 2010, pp. T5-94-T5-101; XP031778368; 2010.

* cited by examiner

STATOR SEGMENT FOR A LINEAR MOTOR-BASED TRANSPORT SYSTEM AND TRANSPORT SYSTEM

BACKGROUND OF THE INVENTION

1. Field of the Invention

The invention relates to a stator segment for a linear motor-based transport system having a coil for generating a magnetic traveling field, a position acquirer for determining a position of a transport rotor located on the stator segment, and a transmitter for cyclic transmission of a control data record in a first clock cycle.

For the purposes of the invention, a stator segment is understood to be a primary part of a linear motor, and in this context a transport rotor has a secondary part of the linear motor. The individual supply of current to, for example, coils for generating a magnetic traveling field results in a magnetic field being generated and the transport rotor or its secondary part respectively being able to move across the stator segment or its primary part respectively. Accordingly, the magnetic traveling field carries with it permanent magnets of the transport rotor. Controlling the current strength of the current through the coils results in it being possible to adjust the power requirement and the speed.

2. Description of the Related Art

Linear motor-based transport system are known. In these conventional installations that employ linear motor-based transport systems, multi-position sensors are used in addition to motor sensors of the stator segments, which are needed for control of the stator segments, for acquiring the positions of the transport rotors. These multi-position sensors have the capability to detect the position of a plurality of transport rotors and provide a higher-level control unit, where a sequence program for controlling movement runs in the higher-level control unit. A disadvantage of this approach is the conventional multi-position sensor that is employed extends continuously over a plurality of segments and has to be connected to an additional bus system. However, the motor sensor already present is connected to a first bus, which is needed in particular for controlling the driving of the stator segments. The multi-position sensor then has to be connected additionally to a second bus, which in turn is connected to the higher-level control facility.

SUMMARY OF THE INVENTION

It is an object of the present invention to reduce the system complexity of a linear motor-based transport system.

This and other objects and advantages are achieved in accordance with the invention by a stator segment for a linear motor-based transport system including a coil for generating a magnetic traveling field, a position acquirer for determining a position of a transport rotor located on the stator segment, and a transmitter for cyclic transmission of a control data record in a first clock cycle, where the position acquirer is configured to detect a plurality of positions of a plurality of transport rotors on the stator segment. In addition, an evaluation unit is present which is connected to the position acquirer to determine the detected positions and is connected to the transmitter to transfer the positions to the transmitter unit, where the transmitter is configured such that, in addition to transmitting the control data record, it also transmits a position value in a clock-synchronized manner, and where the plurality of positions are available as a sequence with a quantity of elements and an element with an index corresponds to a position. The transmitter is furthermore configured such that, upon every first clock cycle, the index is incremented commencing from a starting value and an element is transmitted after the control data record, where the transmitter is furthermore configured to transmit all elements in one transmission interval. In particular, the transmission interval could correspond to a multiple of the first clock cycle.

In accordance with the invention, position sensors or stator segments respectively are used which, apart from transmitting the measured values needed for a control process, also have the capability to acquire a plurality of transport rotor positions. The sensors or segments can initially communicate the multi-position values to a drive control process via the first bus used, in particular a real-time bus. The drive control process in turn communicates the multi-position values to a higher-level control facility via a bus system that is likewise already present. To achieve this, the position acquirer has the capability to acquire a plurality of positions simultaneously. In this case, the additional multi-position sensor in the case of the state of the art shown to be disadvantageous can be entirely omitted.

It is particularly advantageous if the evaluation unit is configured to determine the positions in a second clock cycle and the second clock cycle corresponds to a multiple of the first clock cycle. As a rule, both a movement control process and a combined movement control and drive control process are executed with a slower clock cycle than the drive control process itself. Consequently, the multi-position values are likewise only needed in a slower clock cycle than the data for the control process. Accordingly, it is possible to communicate the multi-position values in an "alternating cyclic telegram". A telegram of this type accordingly has a cyclic portion for the control data record that must be communicated in a "fast" clock cycle, and an alternating portion, the content of which is "multiplexed" over time. With this, a plurality of multi-position values can be communicated over the first bus without influencing a control process because the load on this first bus is then hardly any higher or greater than previously. In the higher-level control unit, in which the program for the movement control is running, the positions acquired from all the position acquirers can be appropriately put together into a representation of all the rotor positions.

It is also an object of the invention to provide a transport system having a stator segment, a first bus, a second bus, a monitoring unit, and a control unit, where the stator segment is configured for a linear motor-based transport of transport rotors with a coil for generating a magnetic traveling field, a position acquirer for determining a position of a transport rotor located on the stator segment, and a transmitter for cyclically transmitting a control data record in a first clock cycle, where the transmitter is connected to the first bus, and where the position acquirer is configured to detect a plurality of positions of a plurality of transport rotors on the stator segment. In addition, an evaluation unit is present which is connected to the position acquirer to determine the detected positions and connected to the transmitter unit to transfer the positions to the transmitter, where the transmitter is configured such that, in addition to transmitting the control data record, it also transmits a position value in a clock-synchronized manner, where the plurality of positions are available as a sequence with a quantity of elements and an element with an index corresponds to a position. The transmitter unit is furthermore configured such that, upon every first clock cycle, the index is incremented commencing from a starting value and an element is transmitted after the control data record to the monitoring unit via the first bus, where the transmitter is furthermore configured to transmit all elements in one transmission interval. In particular, the transmission interval could correspond to a multiple of the first clock cycle. The monitor is configured to receive the sequence and is furthermore configured to transfer the sequence to the controller via the second bus.

By implementing clock-synchronized interlinking of all the components present in the system, it can be ensured that all the positions originate from the same time point. It is then advantageous that an additional component, such as the additional multi-position sensor familiar from the state of the art, can then be entirely omitted. This results not only in a cost reduction but also simplified design and commissioning in the case of linear motor-based transport systems.

Furthermore, variants are no longer required in the case of the linear motor segments because then they all just have to be fitted with a single position acquirer, without having to decide in advance whether the segment is to be operated with closed-loop or open-loop control.

In an embodiment of the transport system, the controller is configured to determine, with the aid of the position, a geographical representation of the locations of all the transport rotors situated in the system. This geographical representation could be passed on by the controller to an HMI system and visualized on the same for a user. Furthermore, monitoring of the positions of the transport rotors can be facilitated with the representation of the locations of all the positions situated in the system.

In an advantageous manner, a converter is available to supply the coil for generating the magnetic traveling field with a current.

Since control can be effected with the converter and, according to the control data record, control is effected over current strength, phase shift, commutating angle or motor temperature for example, the converter is connected to the first bus.

The position acquirer is realized in the form of a travel recorder which operates according to one of the principles: magnetostrictive, capacitive, magnetic, optical, or differentially transforming, and in particular magnetic according to the Hall effect principle and therefore operates as a multi-position acquisition means.

Furthermore, the position acquirer is arranged such that it uninfluenced by a secondary part (permanent magnet) of the transport rotor, where the transport rotors have a permanent magnet or an optical element as a position sensor for the position to determine positions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in detail below on the basis of an exemplary embodiment set forth in the drawing. The figures show the following.

DETAILED DESCRIPTION OF THE EXEMPLARY EMBODIMENTS

Figure 1:
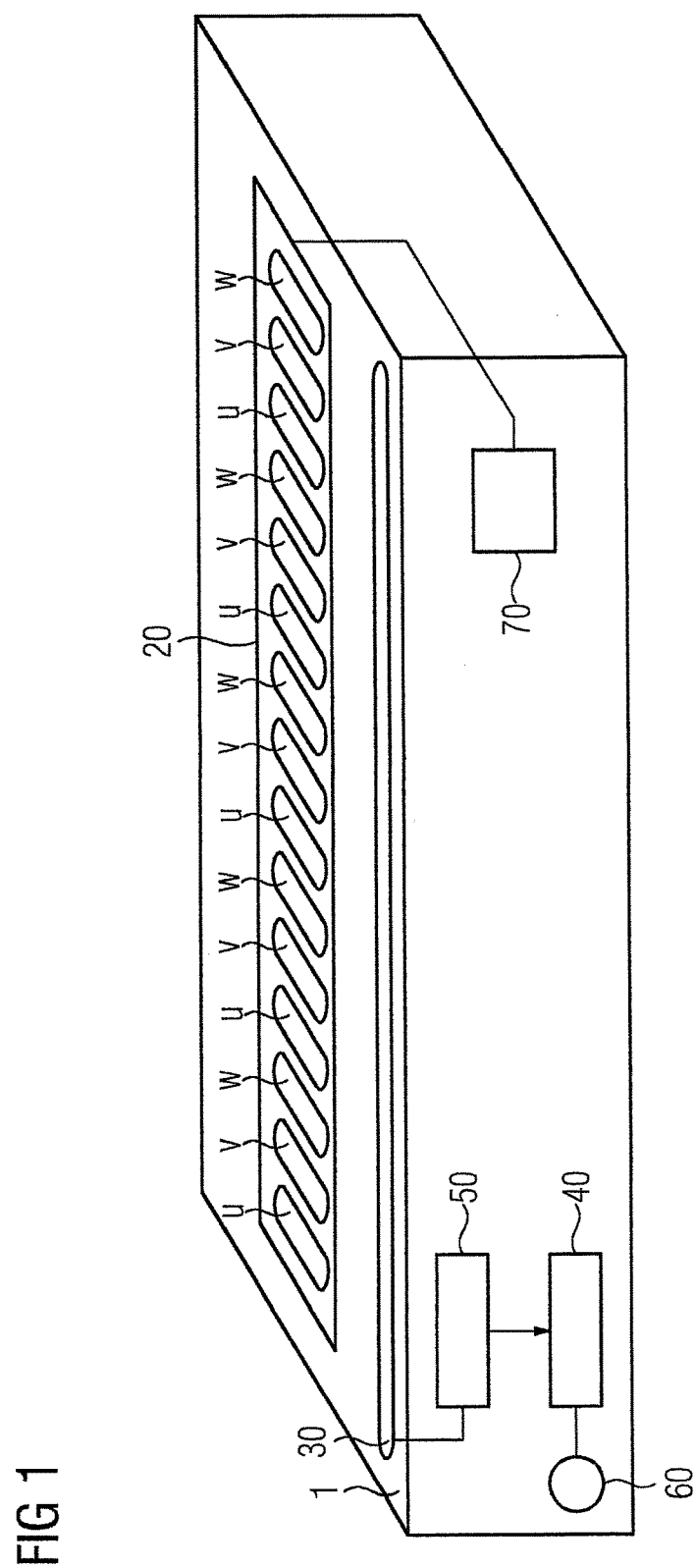
FIG. 1 is a schematic illustration of a stator segment in a perspective view in accordance with the invention.

With reference to FIG. 1, a stator segment 1 for a linear motor-based transport system with a coil 20 for generating a magnetic traveling field is shown. In an advantageous manner, the magnetic traveling field is realized by coils 20 laid alongside each other with the current supply sequence UVW, UVW, UVW, etc. With respect to acquiring a position of a transport rotor arranged on the stator segment 1, a position acquirer 30 is present. A transmitter 40 is connected to an evaluation unit 50, where the evaluation unit 50 is in turn connected to the position acquirer 30. According to the state of the art, it was previously disclosed that the transmitter unit 40 only transmits one control data record. In accordance with the invention, the stator segment 1 is then configured such that the position acquirer 30 can detect a plurality of positions M1, M2 . . . Mn of a plurality of transport rotors T1, T2 . . . Tn (see FIG. 2) on the stator segment 1. In this regard, an evaluation unit 50 is additionally present, where the evaluation unit 50 receives the plurality of positions from the position acquirer 30 and forwards them to the transmitter 40. The transmitter 40 is configured such that, in addition to transmitting the control data record CD, it also transmits a position value Mi in a clock-synchronized manner, where the plurality of positions M1, M2 . . . Mn are available as a sequence F with a quantity n of elements and an element Fi with the index i corresponding to a position Mi, and in this regard the transmitter unit 40 is furthermore configured such that, upon every first clock cycle TA1, the index i is incremented commencing from a starting value and an element Fi is transmitted after the control data record CD, where the transmitter unit 40 is furthermore configured to transmit all elements Fi in one transmission interval Ü, where the transmission interval Ü corresponds to a multiple of the first clock cycle TA1. With respect to a connection to a first bus, the stator segment 1 has a bus connection 60. With respect to supplying the coil for generating the magnetic traveling field, the stator segment 1 has a supply connection 70.

Figure 2:
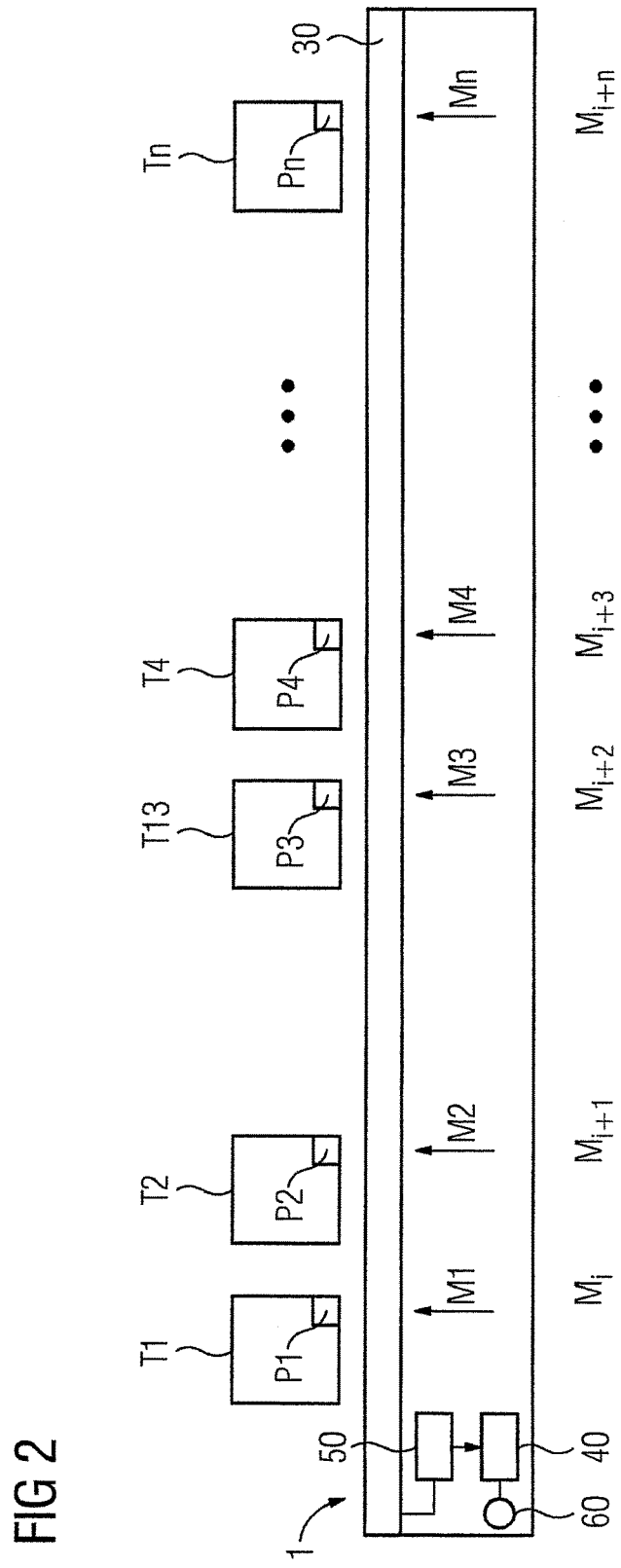
FIG. 2 is a schematic illustration of the stator segment of FIG. 1 in a different view with transport rotors situated on same in accordance with the invention.

In FIG. 2, the stator segment 1 is represented with transport rotors T1 . . . Tn arranged on the same. The position acquirer 30 has the capability to determine a first position M1 for the first transport rotor T1, a second position M2 for the second transport rotor T2, a third position M3 for the third position rotor T3, and a fourth position M4 for the fourth transport rotor T4 through to an n-th position Mn for an n-th transport rotor Tn. The transport rotors T1, T2 . . . Tn each have a permanent magnet as a position sensor P1 . . . Pn. These position sensors P1 . . . Pn interact with the position acquirer 30 and in this regard identify the positions of the transport rotors T1 . . . Tn in the position acquirer 30, for example, in accordance with the principle of magnetostriction. These detected positions M1 ... Mn are worked up by the evaluation unit 50 and communicated to the transmitter 40. The evaluation unit 50 is configured to determine the positions M1 ... Mn jointly at one time point.

The transmitter 40 is configured to transmit, in addition to the control data record CD to be transmitted as usual, a position value Mi in a clock-synchronized manner with the control data record CD, and in this regard a plurality of positions M1 ... Mn form a sequence F with a quantity of N elements. An element Fi in the sequence F therefore has an index i and corresponds to a position Mi. The transmitter 40 is configured such that, upon every first clock cycle TA1, it increments the index i commencing from a starting value and it transmits an element Fi after the control data record CD (see FIG. 4). The transmitter 40 is furthermore configured to transmit all elements Fi in one transmission interval Ü, where the transmission interval Ü corresponds to a multiple of the first clock cycle TA1.

Figure 3:
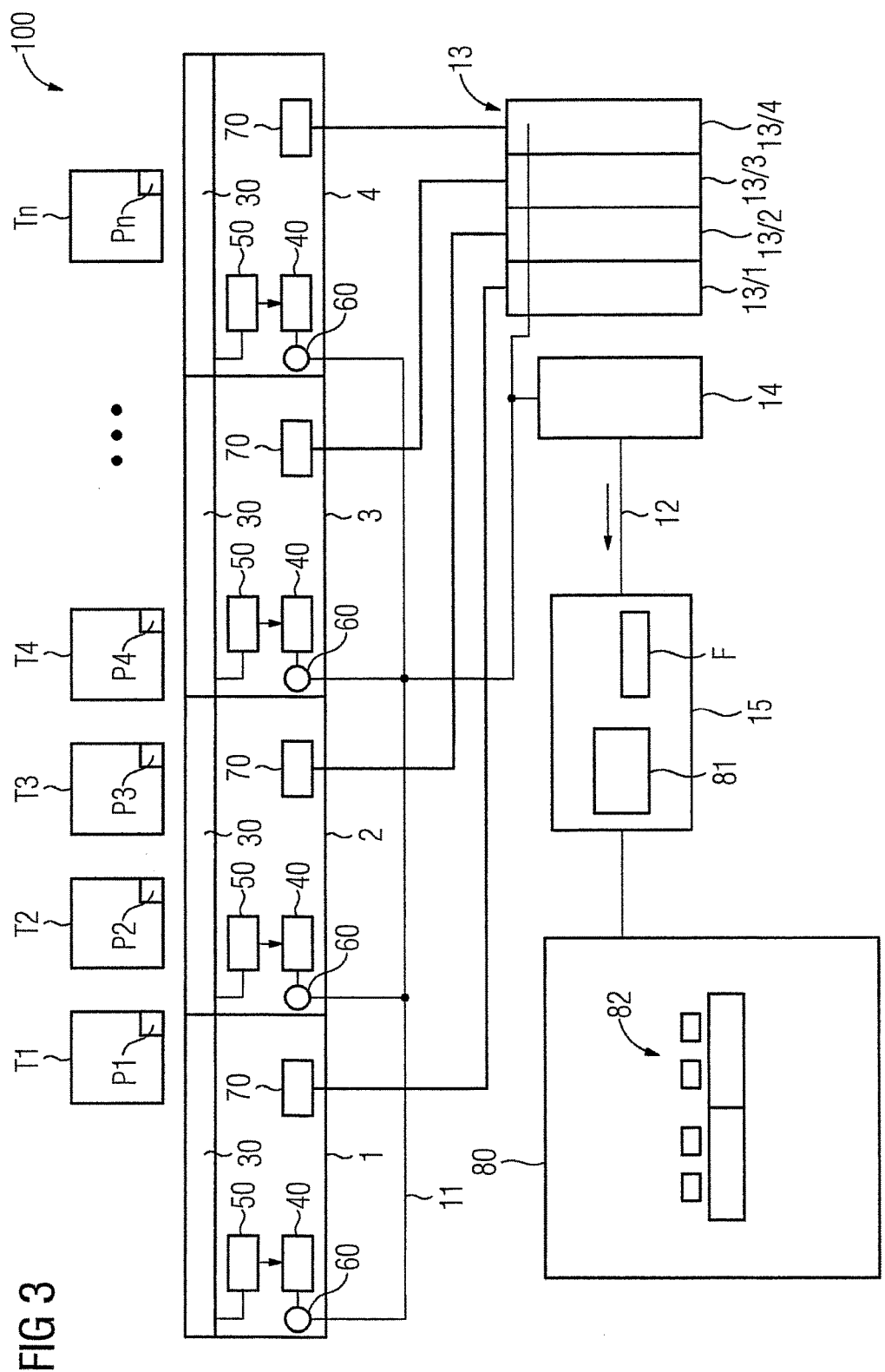
FIG. 3 is a schematic illustration of a linear motorized transport system in accordance with the invention.

Turning to FIG. 3, a linear motor-based system 100 is represented. The transport system 100 comprises a first stator segment 1, a second stator segment 2, a third stator segment 3, and a fourth stator segment 4, where the stator segments 1, 2, 3, 4 are arranged directly behind each other. On the transport path formed by the stator segments 1, 2, 3, 4 are situated a first transport rotor T1 through to an n-th transport rotor Tn.

Each stator segment is configured in a similar manner. The description relating to the configuration of the stator segments has already been set forth with the description relating to FIG. 1.

Each stator segment 1, 2, 3, 4 has a bus connection 60. Accordingly, the stator segments 1, 2, 3, 4 are correspondingly connected by their bus connections 60 to a first bus 11. In turn, first bus 11 is connected to a monitor 14, where the first bus 11 is additionally connected to a converter 13. The converter 13 has a first converter component 13/1 for the first stator segment 1, a second converter component 13/2 for the second stator segment 2, a third converter component 13/3 for the third stator segment 3, and a fourth converter component 13/4 for the fourth stator segment 4. The converter components 13/1, 13/2, 13/2, 13/4 are each connected to the stator segments 1, 2, 3, 4 via the supply connections 70 of the stator segments 1, 2, 3, 4.

If the stator segment 2 in the transport system 100 is considered, then the first transport rotor T1, the second transport rotor T2, and the third transport rotor T3 are currently situated on the stator segment 2. The second stator segment 2 cyclically transmits a control data record CD via the first bus 11 to the monitor 14, so that the same can in turn control the corresponding converter, specifically the second converter component 13/2. As a result, the position M1, as acquired by the position acquirer 30, of the transport rotor T1 is also transmitted by the transmitter 40, in addition to transmitting the control data record CD, as a value in the telegram transmitted for the control data record CD. Following transmission of the next control data record CD to be cyclically transmitted, the position M2 of the transport rotor T2 is also transmitted, in addition to the control data record CD to be transmitted, by the transmitter 40 of the second stator segment 2. And lastly, in a third cycle, the position M3 of the third transport rotor T3 is in turn transmitted in addition to the control data record CD to be cyclically transmitted. Due to transmission via the first bus 11, the transmitted positions M1, M2, M3 are then available in the monitor 14.

Once the transmitter 40 has then transmitted the determined positions in a sequence F containing the elements Fi to the monitor 14, the positions can be transmitted further to a control unit 15 via a second bus 12; since the monitor 14 is realized so as to put the positions Mi together again into a data item, specifically the sequence F, the sequence F can be transferred to the controller 15 via the second bus 12. The multi-position values are then available in the controller 15, which is configured to determine, with the aid of the positions M1 ... Mn, a geographical representation of the locations of all the transport rotors T1 ... Tn situated in the system. This determination of the geographical representation can be transmitted to an HMI device by using a handler 81 in the control facility in the controller 15. The geographical representation 82 then becomes visible on the HMI device 80.

The positions Mi are then indeed transmitted consecutively, but only via the first bus 11. Consequently, the positions Mi arrive in the monitoring unit 14, which in any case is connected to the controller 15 via a second bus 12. The positions Mi are then forwarded to the controller 15 via this second bus 12. Advantageously, an additional position sensor that would have to be connected to the second bus system 12 can then be omitted.

Figure 4:
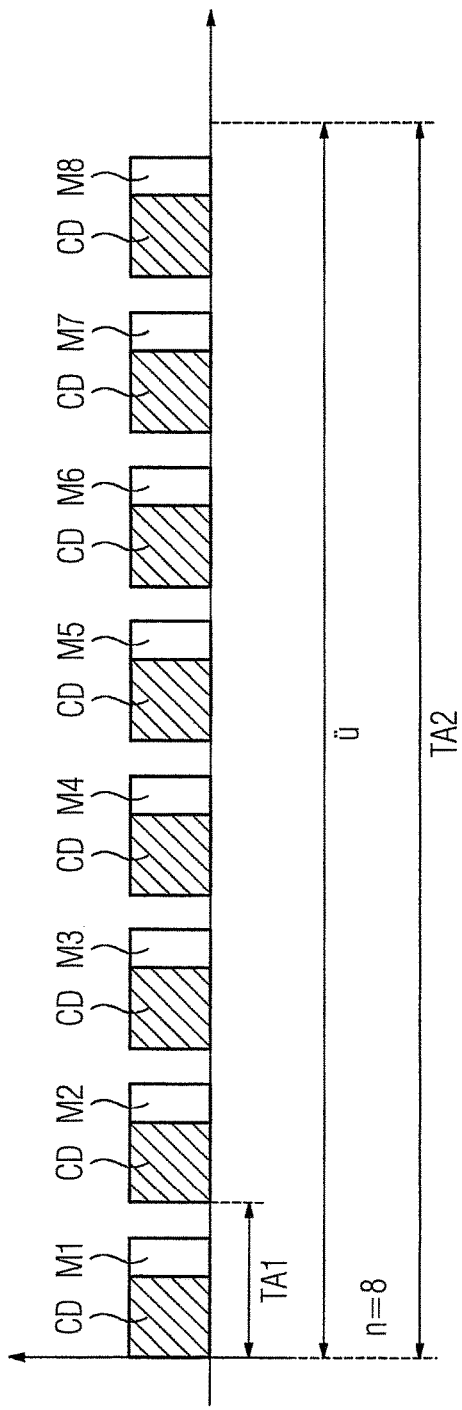
FIG. 4 is a graphical plot of a time sequence of transmitted control data with additionally transmitted multi-position values in accordance with the invention.

FIG. 4 shows a graphical plot of a time sequence of the telegram transmission of cyclically transmitted control data CD. In a first clock cycle TA1, control data records CD are repeatedly transmitted by the stator segments 1, 2, 3, 4. After every cyclically transmitted data record CD, a position Mi is appended in each case. The transmission of all position values Mi should occur in a transmission interval Ü. As a rule, the transmission interval Ü is selected the same as a second clock cycle TA2.

Figure 5:
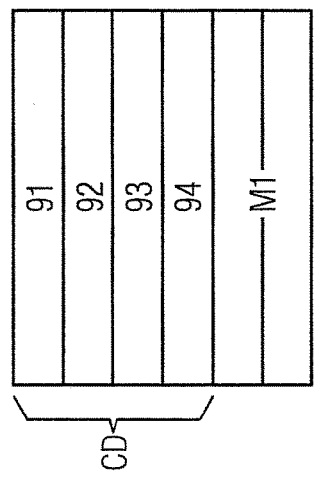
FIG. 5 is an illustration of an exemplary telegram containing control data and an appended multi-position value in accordance with the invention.

FIG. 5 shows an exemplary telegram structure of a packet from the control data record CD with an appended position M1. The control data record CD comprises a first status word 91, a second status word 92, a speed value 93, and a value for a commutating angle 94. Adjoining the control data record is a two-word-long place holder in which the double word-length-long value of the position M1 can be transmitted.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A stator segment for a linear motor-based transport system comprising:
   coils arranged to generate a magnetic traveling field;
   a position acquirer which determines a position of a transport rotor located on the stator segment, said position acquirer detecting a plurality of positions of a plurality of transport rotors located on the stator segment;

a transmitter which cyclically transmits a control data record in a first clock cycle, said transmitter being configured such that, in addition to transmitting the control data record, a position value is also transmitted in a clock-synchronized manner; and an evaluation unit connected to the position acquirer to determine the detected plurality of positions and connected to the transmitter to transfer each of the detected plurality of positions to the transmitter;

wherein the plurality of positions are available as a sequence with a quantity of elements and an element with an index (i) corresponds to a position; and wherein the transmitter is further configured such that, upon every first clock cycle, the index (i) is incremented commencing from a starting value and the element is transmitted after the control data record, and further configured such that transmission of all elements in one transmission interval.

2. The stator segment as claimed in claim 1, wherein the evaluation unit is configured to determine each of the plurality of positions in a second clock cycle and the second clock cycle corresponds to a multiple of the first clock cycle.

3. A transport system comprising:
a stator segment configured for a linear motor-based transport of transport rotors with a coil which generates a magnetic traveling field;
a first bus;
a second bus;
a monitor;
a controller;
a position acquirer which determines a position of a transport rotor located on the stator segment, said position acquirer being configured to detect a plurality of positions of a plurality of transport rotors located on the stator segment; and
a transmitter connected to the first bus, said transmitter cyclically transmitting a control data record in a first clock cycle, and said transmitter being configured such that, in addition to transmitting the control data record, a position value is also transmitted in a clock-synchronized manner;
an evaluation unit connected to the position acquirer to determine the detected plurality of positions and connected to the transmitter unit to transfer the detected plurality of positions to the transmitter;
wherein the plurality of positions are available as a sequence with a quantity of elements and an element with an index (i) corresponds to a position;
wherein the transmitter is further configured such that, upon every first clock cycle, the index (i) is incremented commencing from a starting value and the element is transmitted after the control data record to the monitoring unit via the first bus, and further configured such that transmission of all elements in one transmission interval; and
wherein the monitor is configured to receive the sequence and configured to transfer the sequence to the controller via the second bus.

4. The transport system as claimed in claim 3, wherein the controller is configured to determine, aided by the plurality of positions, a geographical representation of the locations of all the transport rotors situated in the system.

5. The transport system as claimed in claim 4, wherein a converter is connected to the coil which generate the magnetic traveling field.

6. The transport system as claimed in claim 3, wherein a converter is connected to the coil which generate the magnetic traveling field.

7. The transport system as claimed in claim 6, wherein the monitor is connected to the converter via the first bus.

8. The transport system as claimed in claim 3, wherein the position acquirer comprises a travel recorder which operates in accordance with one of the following principles: magnetostrictive, capacitive, magnetic, optical and or differentially transforming.

9. The transport system as claimed in claim 8, wherein the travel recorder operates magnetically in accordance with Hall effect principles as a multi-position acquirer.

10. The transport system as claimed in claim 3, wherein the position acquirer is arranged such that it is uninfluenced by a secondary part of the transport rotor; and wherein the transport rotors have a permanent magnet or an optical element as a position sensor for the position acquirer to determining positions.

* * * * *